(12) United States Patent
Lotito et al.

(10) Patent No.: US 9,617,037 B2
(45) Date of Patent: Apr. 11, 2017

(54) LABEL ADHESIVE AND CURLING RESIST COATING PATTERNING

(75) Inventors: Vincent Lotito, Dayton, NJ (US); Brett Einerwold, La Crescent, MN (US)

(73) Assignee: INLAND LABEL AND MARKETING SERVICES, LLC, Lacrosse, WI (US)

( * ) Notice: Subject to any disclaimer, the term of this patent is extended or adjusted under 35 U.S.C. 154(b) by 604 days.

(21) Appl. No.: 12/905,670

(22) Filed: Oct. 15, 2010

(65) Prior Publication Data

US 2012/0091023 A1  Apr. 19, 2012

(51) Int. Cl.
| | | |
|---|---|---|
| *B42D 15/00* | (2006.01) | |
| *B29C 65/00* | (2006.01) | |
| *B32B 37/00* | (2006.01) | |
| *B42D 19/00* | (2006.01) | |
| *B65D 23/08* | (2006.01) | |
| *B65D 41/62* | (2006.01) | |
| *G09F 23/06* | (2006.01) | |
| *G09F 3/10* | (2006.01) | |
| *B32B 3/10* | (2006.01) | |
| *B32B 3/26* | (2006.01) | |

(52) U.S. Cl.
CPC ............. *B65D 23/085* (2013.01); *B32B 3/10* (2013.01); *B32B 3/266* (2013.01); *B65D 41/62* (2013.01); *G09F 3/10* (2013.01); *G09F 23/06* (2013.01); *B32B 2519/00* (2013.01); *B65D 2203/00* (2013.01); *Y10T 428/24322* (2015.01); *Y10T 428/24752* (2015.01)

(58) Field of Classification Search
CPC .......... B42D 1/00; B42D 19/00; B42D 15/00; B29C 65/00; B32B 37/00; B32B 3/266; B32B 3/10; B32B 2519/00; B65D 23/085; B65D 41/62; B65D 2203/00; G09F 23/06; G09F 3/10
USPC ................... 281/2, 5, 9, 12, 14; 283/81, 83; 156/289; 428/98, 221, 343
See application file for complete search history.

(56) References Cited

U.S. PATENT DOCUMENTS

| | | | |
|---|---|---|---|
| 4,510,006 A * | 4/1985 | Lawson | 283/74 |
| 6,076,859 A * | 6/2000 | Hall | G09F 3/0294 283/70 |
| 6,171,734 B1* | 1/2001 | Warner et al. | 283/83 |
| 6,994,899 B2* | 2/2006 | McClelland et al. | 428/40.1 |
| 2003/0034645 A1* | 2/2003 | Dronzek et al. | 283/81 |
| 2007/0029790 A1* | 2/2007 | Hudson | B42D 15/042 283/106 |
| 2007/0204493 A1* | 9/2007 | Foley | B41M 5/502 40/299.01 |
| 2008/0010885 A1* | 1/2008 | Herb | 40/773 |
| 2008/0311331 A1* | 12/2008 | Laprade | B41F 9/002 428/40.5 |
| 2009/0039642 A1* | 2/2009 | Kawamoto | G09F 3/0288 283/70 |
| 2009/0206594 A1* | 8/2009 | Tokita | B65C 1/025 283/81 |

* cited by examiner

*Primary Examiner* — Shelley Self
*Assistant Examiner* — Justin V Lewis
(74) *Attorney, Agent, or Firm* — Foley & Lardner LLP

(57) ABSTRACT

An article of manufacture includes a label, a first glue resist area. The first glue resist area is located on a back of the label. The first glue resist area is configured to prevent at least one edge of the label from curling during a labeling process.

17 Claims, 6 Drawing Sheets

LABEL ADHESIVE AND CURLING RESIST COATING PATTERNING

BACKGROUND

The following description is provided to assist the understanding of the reader. None of the information provided or references cited is admitted to be prior art.

The present invention relates generally to the field of adhesive application and more particularly to label adhesive application.

Labels can be affixed to bottles in order to provide information, advertisement, and safety mechanisms. A typical label includes a substrate such as paper, plastic, or paper-foil combination. The substrate is usually printed on one or both sides with text and graphics. Many labels are semi-permeable or not permeable.

When a label is applied to a bottle at a packaging plant, a labeling machine applies an adhesive to the label and applies the label to the bottle. Afterwards, the label can be pressed or brushed to the bottle to ensure good adhesion. There is a delay between when the adhesive is first applied to the label and when the label is pressed to the bottle. Depending on the speed of the bottling machine, the delay can vary.

When the adhesive is applied the substrate of the label, the adhesive can begin to react with the substrate. For instance, the solvent or water of the adhesive can begin to soak into the substrate of the label. Especially when the label is not permeable and the delay is large, the solvent cannot escape, and the substrate can begin to swell causing the label to curl. For example, when the substrate is paper and the adhesive is water-based, the paper can absorb the water and swell. A curled label is unattractive, culling of otherwise good product, and may cause machinery malfunctions.

Therefore, there is a need for adhesive systems and methods to prevent label curling. Furthermore, there is a need for inexpensive labeling systems that are attractive.

SUMMARY

An illustrative article of manufacture includes a label, a first glue resist area and a second glue resist area. The first glue resist area is located on a back of the label. The second glue resist area is located on the back of the label. The first glue resist area and the second glue resist area are configured to prevent at least one edge of the label from curling during a labeling process.

An illustrative method for making a curl-resistant label includes providing a label and applying glue resist. The glue resist is applied to a first glue resist area on a back of the label and a second glue resist area on the back of the label. The first glue resist area and the second glue resist area are configured to prevent at least one edge of the label from curling during a labeling process.

An illustrative apparatus includes a container, a label, a first glue resist area and a second glue resist area. The first glue resist area is located on a back of the label. The second glue resist area is located on the back of the label. The label is attached to the container using an adhesive. The first glue resist area and the second glue resist area prevents a solvent of the adhesive from reaching the label. The first glue resist area and the second glue resist area are configured to prevent at least one edge of the label from curling during a labeling process.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE EMBODIMENTS

Figure 1:
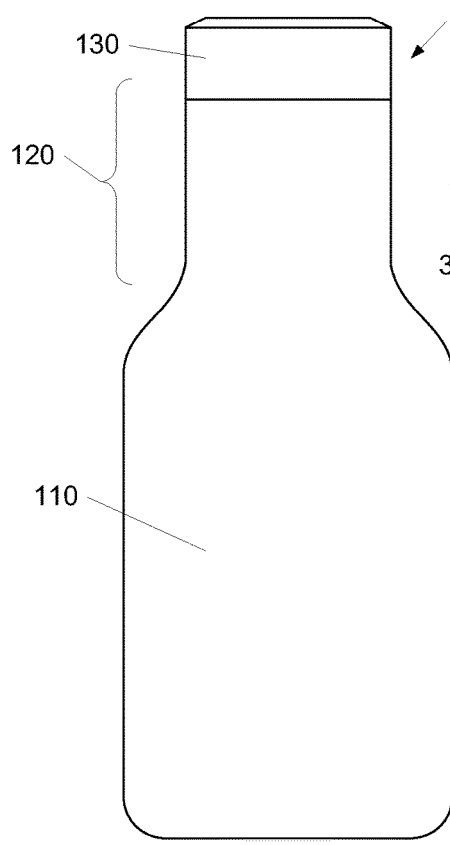
FIG. 1 is a side view of a bottle in accordance with an illustrative embodiment.

In the following detailed description, reference is made to the accompanying drawings, which form a part hereof. In the drawings, similar symbols and numbering typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Referring to FIG. 1, a side view of a bottle 100 in accordance with an illustrative embodiment is shown. The bottle 100 includes a body 110. The body 110 includes a neck 120. The bottle 100 also includes a cap 130 which can be affixed to the body 110, for example, by threading and a seal. The bottle 100 and the cap 130 can be made of polyethylene terephthalate (PET), glass, aluminum, high density polyethylene (HDPE), low density polyethylene (LDPE), polyvinyl chloride (PVC), polypropylene, polystyrene, or any other material. In one illustrative embodiment, the bottle 100 can be a wide-mouth bottle with a neck diameter in range of about 1" to about 2.75"; although the neck 120 can be any diameter. The bottle 100 can have a height from about 5" to about 10"; although the bottle 100 can be any height. The body 110 can be cylindrical in shape or any other shape. The neck 120 can be cylindrical in shape or any other shape. Alternatively, the bottle can be any other kind of container or product to which a label can be applied.

Figure 2:
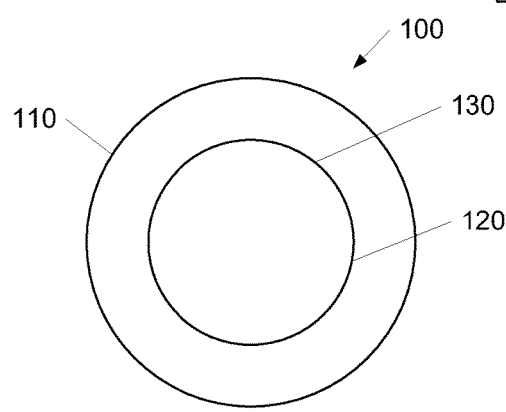
FIG. 2 is a top view of the bottle of FIG. 1 in accordance with an illustrative embodiment.

Referring to FIG. 2, a top view of the bottle 100 of FIG. 1 in accordance with an illustrative embodiment is shown. The bottle 100 includes a body 110. The body 110 includes a neck 120. The bottle 100 also includes a cap 130 which can be affixed to the body 110. The body 110 can have a circular cross section, although the body 110 can be square or any other shape. The neck 120 can have a circular cross section, although the neck 120 can be square or any other shape.

Figure 3:
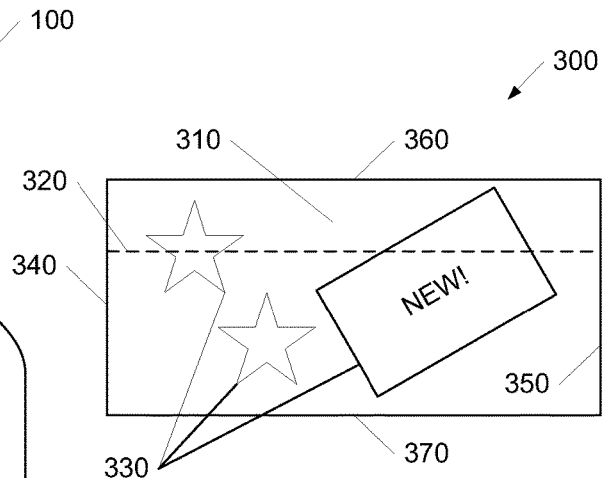
FIG. 3 is a front view of a label in accordance with an illustrative embodiment.

Referring to FIG. 3, a front view of a label 300 in accordance with an illustrative embodiment is shown. The label 300 includes a substrate 310. The substrate 310 can be defined by a leading edge 340, a trailing edge 350, a top edge 360, and a bottom edge 370. The substrate 310 can be paper, coated paper, paper-foil combination, metalized paper, laminated paper, a polymer film, plastic, heat-shrink plastic, or any other substrate. The substrate 310 can include multiple layers. The substrate 310 can be permeable, semi-permeable or not permeable. The substrate 310 can be embossed or partially embossed. The substrate 310 can have various properties, for example, where the substrate is paper, the substrate 310 can have a range of moisture contents. The substrate 310 can be die-cut into a desired shape. The label 300 can be applied to a bottle or any other product. In one illustrative embodiment, the label 300 can be rectangular and about 3" wide and 6"-7" long. Labels can be created in stacks or as part of a roll.

The substrate 310 can include graphics 330. The graphics 330 can be applied to the substrate 310 using, for example, a rotogravure or flexographic printing process. The press can be, for example, a rotogravure-type or flexographic-type press available from W.R. Chesnut Engineering, Inc., Fairfield, N.J. The graphics 330 can be sealed to the substrate 310 with a coating applied during printing.

The label 300 can include a perforation 320. The perforation 320 can extend horizontally across the label 300 so that when the label 300 is affixed to a neck and cap of a bottle, a person can easily break the perforation 320 and remove the cap. The perforation 320 can be created, for example, using a perforation wheel or a die. Alternatively, a perforation can run vertically across a label so that a person can easily tear off the label or a portion of the label.

Figure 4:
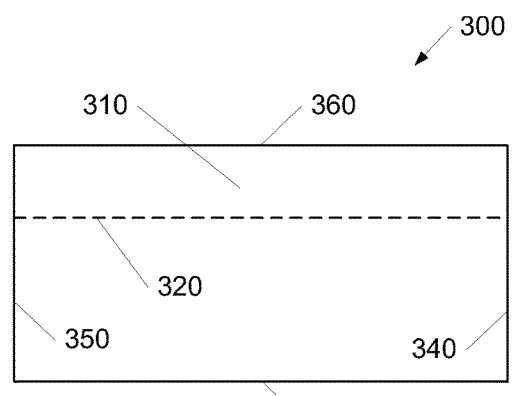
FIG. 4 is a back view of the label of FIG. 3 in accordance with an illustrative embodiment.

Referring to FIG. 4, a back view of the label 300 of FIG. 3 in accordance with an illustrative embodiment is shown. The label 300 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. When the label 300 is prepared for affixation to, for example, a bottle, the entire back is coated with adhesive. Alternatively, a portion of the rear of the label 300 can be coated with adhesive.

The substrate 310 can include graphics (not shown). The label 300 can include a perforation 320. The perforation 320 can extend horizontally across the label 300 so that when the label 300 is affixed to a neck and cap of a bottle, a person can easily break the perforation 320 and remove the cap. The perforation 320 can be created, for example, using a perforation wheel or a die. Alternatively, a perforation can run vertically across a label so that a person can easily tear off the label or a portion of the label. The perforation 320 can be surrounded by a glue resist (not shown) such as lacquer. The glue resist maintains the continuity of the material around the perforation 320 when an adhesive is applied. For example, when the substrate 310 is paper, a glue resist can protect fibers around the perforation 320 so that a person can easily tear the substrate 310 at the perforation 320. Solvent in an adhesive can soften the fibers in paper making the paper spongy and hard to tear, even with a perforation.

Figures 5, 7:
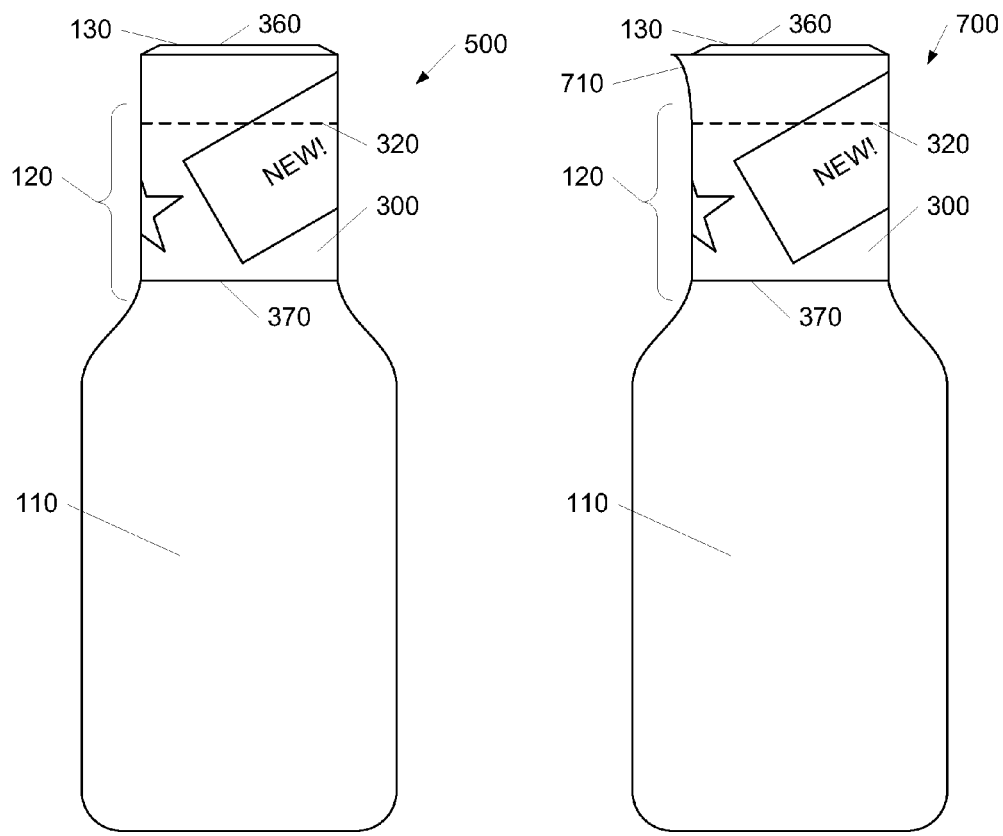
FIG. 5 is a side view of a properly labeled bottle in accordance with an illustrative embodiment.
FIG. 7 is a side view of a defectively labeled bottle in accordance with an illustrative embodiment.

Referring to FIG. 5, a side view of a properly labeled bottle 500 in accordance with an illustrative embodiment is shown. The properly labeled bottle 500 includes a body 110. The body 110 includes a neck 120. The properly labeled bottle 500 also includes a cap 130 which can be affixed to the body 110, for example, by threading and a seal.

A label 300 can be adhered to the neck 120 such that a top edge 360 and a bottom edge 370 of the label 300 lie flat against the surface of the neck 120 and the cap 130. The label 300 includes a perforation 320. A person can easily break the perforation 320 by twisting the cap 130. Thus, the label 300 acts as a tamper-evident seal.

Figures 6, 8:
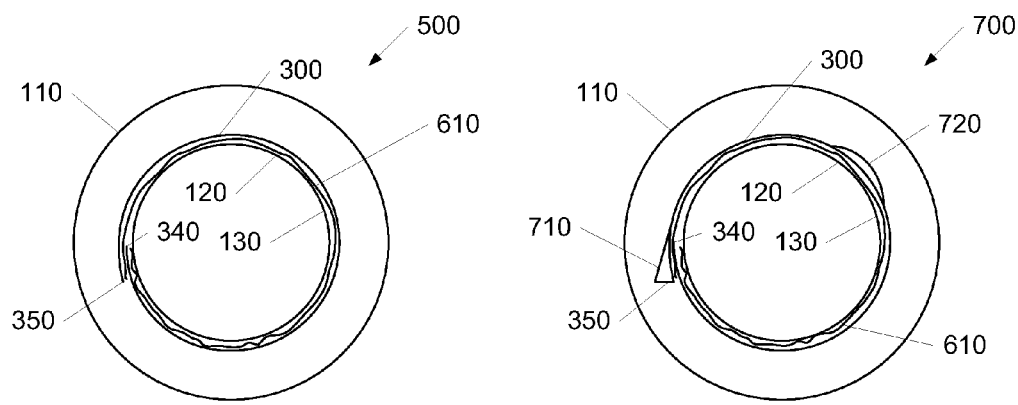
FIG. 6 is a top view of the properly labeled bottle of FIG. 5 in accordance with an illustrative embodiment.
FIG. 8 is a top view of the defectively labeled bottle of FIG. 7 in accordance with an illustrative embodiment.

Referring to FIG. 6, a top view of the properly labeled bottle 500 of FIG. 5 in accordance with an illustrative embodiment is shown. The label 300 is affixed to neck 120 with adhesive 610. In one illustrative embodiment, the entire back of label 300 is coated with adhesive 610. The trailing edge 350 of label 300 overlaps the leading edge 340. After initial application, the label 300 can be pressed against the neck 120. The label 300 lies flat against the surface of the neck 120 and the cap 130.

The adhesive 610 can be, for example, a dispersion adhesive such as a water-based adhesive. The adhesive 610 can be any adhesive, depending on the materials of the bottle and label. The adhesive 610 can be, for example, vinyl acetate, ethylene vinyl acetate, acrylics, styrene-butadiene rubber, natural rubber latex, synthetic elastomers, polyurethane, glutin-based, starch-based, or casein-based. The adhesive 610 can include solvents such as water or organic solvents.

However, in some applications, the label does not always lie flat against the surface of the neck and the cap. Referring to FIG. 7, a side view of a defectively labeled bottle 700 in accordance with an illustrative embodiment is shown. The defectively labeled bottle 700 includes a body 110. The body 110 includes a neck 120. The defectively labeled bottle 700 also includes a cap 130 which can be affixed to the body 110, for example, by threading and a seal. A label 300 including a perforation 320 can be adhered to the neck 120 with an adhesive.

The label 300 of the defectively labeled bottle 700 includes a curled edge 710 on a top edge 360 of the defectively labeled bottle 700. Thus, the top edge 360 does not lie flat. When the adhesive is applied to the label 300, the adhesive can begin to interact with a substrate of the label 300. The solvent of the adhesive can begin to soak into the substrate of the label. Especially when the label is not permeable, the solvent cannot escape, and the substrate can begin to swell causing the label to curl. For example, when the substrate is metalized paper and the adhesive is water-based, the paper can absorb the water and swell. The metalized paper does not allow the water to escape, enhancing the swelling. A curled label is unattractive and may cause machinery malfunctions. In other illustrative embodiments, solvent could react with a plastic label causing it to expand and form a curl.

Referring to FIG. 8, a top view of the defectively labeled bottle 700 of FIG. 7 in accordance with an illustrative embodiment is shown. The label 300 is affixed to neck 120 with adhesive 610. In one illustrative embodiment, the entire back of label 300 is coated with adhesive 610. The trailing edge 350 of label 300 overlaps the leading edge 340. After initial application, the label 300 can be pressed against the neck 120. The label 300 should lie flat against the surface of the neck 120 and the cap 130. However, the label 300 of the defectively labeled bottle 700 includes a curled edge 710 on a top edge 360 of the defectively labeled bottle 700. Thus, the top edge 360 does not lie flat. In addition, a second curled edge 720 in the middle of the top edge 360, which makes the label bulge, is shown. As discussed above, the curling, swelling, and/or bulging can be caused by the adhesive interacting with the substrate of the label. Alternatively, bulges or bubbling can also occur in the field of the label because of the adhesive interacting with the label, especially where the labeling substrate is inconsistent.

Figure 9:
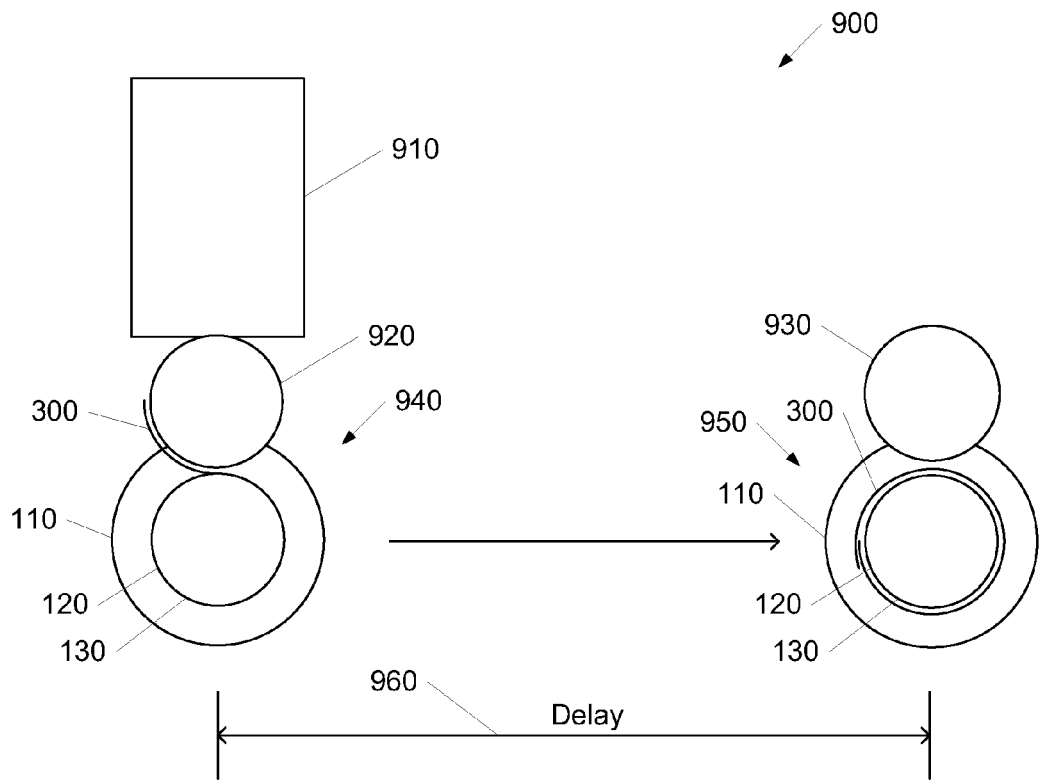
FIG. 9 is a top view of a labeling line in accordance with an illustrative embodiment.

In one illustrative embodiment, label curling can occur mainly because of delay in the labeling process. Referring to FIG. 9, a top view of a labeling line 900 in accordance with an illustrative embodiment is shown. The labeling line 900 includes a labeling station 910 and a stomper 930. The labeling line 900 applies labels to bottles or any other container. The bottles can be filled or unfilled. A bottle 940 includes a body 110, a neck 120, and a cap 130, as described above.

The labeling line 900 can be, for instance, a Krones Solomatic or Topmatic labeling system made by Krones AG of Neutraubling, Germany. The labeling station 910 includes an application roller 920. The labeling station 910 applies adhesive to a label 300 and prepares the label 300 for affixation on the application roller 920. The adhesive can be, for example, Henkel Optal 10-7302M available from Henkel Corporation, Düsseldorf, Germany. As the bottle 940 passes the labeling station 910, the application roller 920 affixes the label 300 to a neck 120 and cap 130 of bottle 940.

After a delay 960, as bottles move through the labeling line 900, a labeled bottle 950 arrives at the stomper 930. The stomper 930 presses the label 300 of labeled bottle 950 against the neck 120 of labeled bottle 950. The stomper 930 can be a brush, a roller, or a material a bottle can be rolled against.

Figure 10:
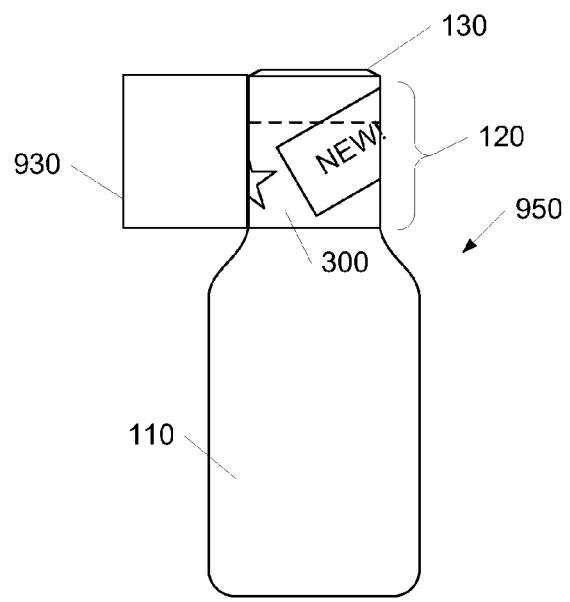
FIG. 10 is a side view of the stomper of FIG. 9 in accordance with an illustrative embodiment.

During the delay 960, adhesive applied at the labeling station 910 can begin to interact with the label 300. As described above, the label 300 can begin to swell and curl. If the delay 960 is short, the stomper 930 can press the label 300 of labeled bottle 950 against the neck 120 of labeled bottle 950 before the adhesive has lost the ability to re-adhere to the neck 120 of labeled bottle 950. Referring to FIG. 10, a side view of the stomper 930 of FIG. 9 in accordance with an illustrative embodiment is shown. As discussed above, the stomper 930 can press the label 300 of labeled bottle 950 against the neck 120 of labeled bottle 950.

Referring again to FIG. 9, for instance, where the adhesive is water-based, the substrate of the label 300 absorbs the water in the adhesive causing the adhesive to cure or harden thereby reducing the adhesive's ability to re-adhere to the neck 120 of labeled bottle 950. In this case, after being pressed by the stomper 930, the label 300 might not adhere or only temporarily re-adhere.

Thus, label curling can be avoided by shortening the delay 960 between the labeling station 910 and the stomper 930. Alternatively, the set-up time of the adhesive can be adjusted to prevent label curl. However, on a slow bottle line, it may not be possible to reduce delay 960 to a point where label curling does not occur. In particular, wide-mouth, large bottles, or irregular bottles may have to be labeled at a slower rate. A slow bottle line can label approximately 200-250 bottles per minute. A fast bottle line labels upwards of 600 bottles per minute.

Figure 11:
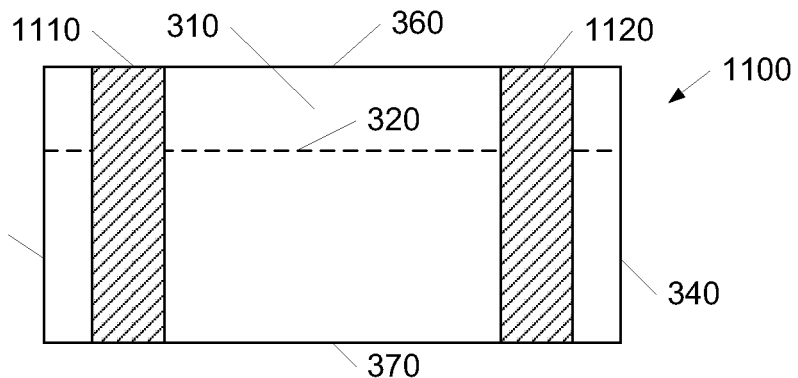
FIG. 11 is a back view of a label with a first glue resist pattern in accordance with an illustrative embodiment.

Label curling can also be controlled by controlling solvent absorption into a label or by controlling the adhesive placement on a label. Referring to FIG. 11, a back view of a label with a first glue resist pattern 1100 in accordance with an illustrative embodiment is shown. The label 1100 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1100 is about 3" by 7" in dimension. The label 1100 can be a neck label, a front label, a back label, or any other kind of label.

The substrate 310 can include graphics (not shown). The label 1100 can include a perforation 320. The perforation 320 can extend horizontally across the label 300. Alternatively, a perforation can run vertically across a label. The perforation 320 can be surrounded by a glue resist (not shown) such as lacquer.

The label 1100 includes a first glue resist strip 1110 and a second glue resist strip 1120. The first glue resist strip 1110 and the second glue resist strip 1120 are about 0.5" wide and extend from the top edge 360 to the bottom edge 370. An edge of the first glue resist strip 1110 is offset from the trailing edge 350 by about 0.75" so that a 0.75" strip of substrate 310 is exposed. An edge of the second glue resist strip 1120 is offset from the leading edge 340 by about 0.75" so that a 0.75" strip of substrate 310 is exposed. Alternatively, the glue resist strips can be of any width and offset. Alternatively, a glue resist strip can be only on one side of the label. Alternatively, the glue resist strip can be placed directly against the label edge.

The first glue resist strip 1110 and the second glue resist strip 1120 are made of a glue resist such that a solvent of the adhesive is prevented from entering the particular portion of the substrate 310. The glue resist can also prevent adhesive from sticking to the particular portion of the substrate 310.

The glue resist can also be referred to as an adhesive resist or anti-adhesive. The glue resist can be, for example, lacquer, wax, polymer, a plastic film, a hydrophobic coating, or any other material that resists the attachment or solvent of the adhesive. In one illustrative embodiment, the glue resist is Flexcon Release Lacquer available from Flint Group, Ann Arbor, Mich. The first glue resist strip 1110 and the second glue resist strip 1120 can be applied using a printing press. For example, a coating module can be used during the graphic printing of the label. An intaglio process such as rotogravure or flexography can be used to apply the glue resist. Alternatively, the glue resist can be applied using standard glue needles, rollers, spray mechanisms, or an offline coater. Where the glue resist is an applied film, the film can be adhered to the labels.

When the label 1100 is prepared for affixation to, for example, a bottle, the entire back surface is coated with adhesive, for example, by a labeling station. In one illustrative embodiment, the first glue resist strip 1110 and the second glue resist strip 1120 prevent the solvent of the adhesive from contacting or soaking into the area of the label 1100 beneath the first glue resist strip 1110 and the second glue resist strip 1120. The solvent of the adhesive can be water, an organic solvent, or any other solvent. In another illustrative embodiment, the adhesive only sticks to portions of the label 1100 that are not covered by the first glue resist strip 1110 and the second glue resist strip 1120. Advantageously, the first glue resist strip 1110 and the second glue resist strip 1120 prevent the label 1100 from curling during application while still providing sufficient surface area for adhesive to bond the label 1100 to a bottle neck. Alternatively, a portion of the rear of the label 1100 can be coated with adhesive.

In one illustrative embodiment, an article of manufacture includes a label and at least one glue resist area. The at least one glue resist area is located on a back of the label. The at least one glue resist area is configured to prevent at least one edge of the label from curling during a labeling process.

Figure 12:
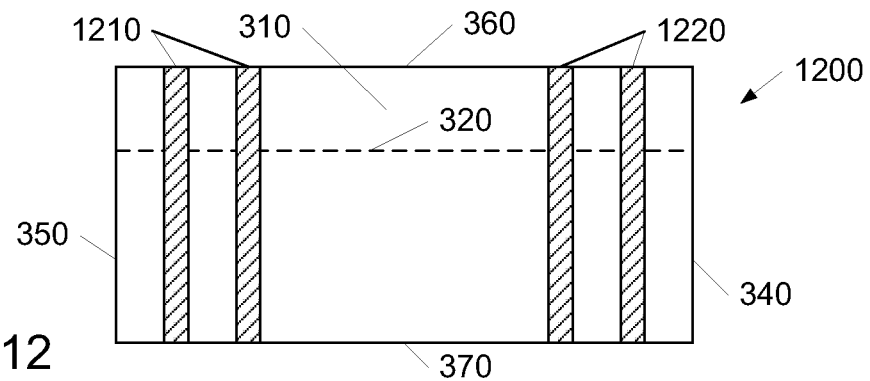
FIG. 12 is a back view of a label with a second glue resist pattern in accordance with an illustrative embodiment.

Referring to FIG. 12, a back view of a label with a second glue resist pattern 1200 in accordance with an illustrative embodiment is shown. The label 1200 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1200 is about 3" by 7" in dimension. The label 1200 can be a neck label, a front label, a back label, or any other kind of label.

The substrate 310 can include graphics (not shown). The label 1200 can include a perforation 320. The perforation 320 can extend horizontally across the label 300. Alternatively, a perforation can run vertically across a label. The perforation 320 can be surrounded by a glue resist (not shown) such as lacquer.

The label 1200 includes first glue resist strips 1210 and second glue resist strips 1220. The first glue resist strips 1210 and the second glue resist strips 1220 are each about 0.375" wide and extend from the top edge 360 to the bottom edge 370. A first of the first glue resist strips 1210 is offset from the trailing edge 350 by about 0.375" so that a 0.375" strip of substrate 310 is exposed. A first of the second glue resist strips 1220 is offset from the leading edge 340 by about 0.375" so that a 0.375" strip of substrate 310 is exposed. The first glue resist strips 1210 and the second glue resist strips 1220 are made of a glue resist, as described above.

When the label 1200 is prepared for affixation to, for example, a bottle, the entire back surface is coated with adhesive, for example, by a labeling station. In one illustrative embodiment, the first glue resist strips 1210 and the second glue resist strips 1220 prevent the solvent of the adhesive from contacting or soaking into the area of the label 1200 beneath the first glue resist strips 1210 and the second glue resist strips 1220. The solvent of the adhesive can be water, an organic solvent, or any other solvent. In another illustrative embodiment, the adhesive only sticks to portions of the label 1200 that are not covered by the first glue resist strips 1210 and the second glue resist strips 1220. Advantageously, the first glue resist strips 1210 and the second glue resist strips 1220 prevent the label 1200 from curling during application while still providing sufficient surface area for adhesive to bond the label 1200 to a bottle neck. Alternatively, a portion of the rear of the label 1200 can be coated with adhesive.

An article of manufacture includes a label, a first plurality of glue resist strips and a second plurality of glue resist strips. The first plurality of glue resist strips is located on a back of the label. The second plurality of glue resist strips is located on the back of the label. The first plurality of glue resist strips and the second plurality of glue resist strips are configured to prevent at least one edge of the label from curling during a labeling process. The first plurality of glue resist strips and the second plurality of glue resist strips can each comprise at least two glue resist strips that extend from the top edge of the label to the bottom edge of the label. The first plurality of glue resist strips and the second plurality of glue resist strips are each offset from the leading edge and trailing edge, respectively.

Figure 13:
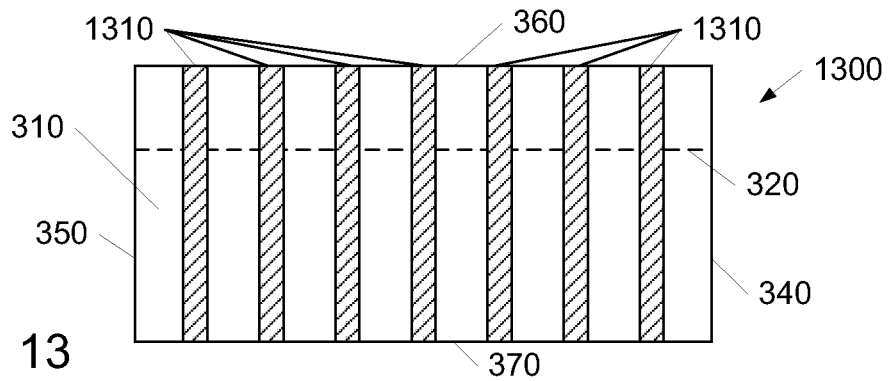
FIG. 13 is a back view of a label with a third glue resist pattern in accordance with an illustrative embodiment.

Referring to FIG. 13, a back view of a label with a third glue resist pattern 1300 in accordance with an illustrative embodiment is shown. The label 1300 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1300 is about 3" by 7" in dimension. The label 1300 can be a neck label, a front label, a back label, or any other kind of label.

The substrate 310 can include graphics (not shown). The label 1300 can include a perforation 320. The perforation 320 can extend horizontally across the label 300. Alternatively, a perforation can run vertically across a label. The perforation 320 can be surrounded by a glue resist (not shown) such as lacquer.

The label 1300 includes a plurality of glue resist strips 1310. The plurality of glue resist strips 1310 are each about 0.2" wide and extend from the top edge 360 to the bottom edge 370. The plurality of glue resist strips 1310 can be evenly spaced across the label 1300, leaving portions of exposed substrate 310. The plurality of glue resist strips 1310 are made of a glue resist, as described above.

When the label 1300 is prepared for affixation to, for example, a bottle, the entire back surface is coated with adhesive, for example, by a labeling station. In one illustrative embodiment, the plurality of glue resist strips 1310 prevent the solvent of the adhesive from contacting or soaking into the area of the label 1300 beneath the plurality of glue resist strips 1310. The solvent of the adhesive can be water, an organic solvent, or any other solvent. In another illustrative embodiment, the adhesive only sticks to portions of the label 1300 that are not covered by the plurality of glue resist strips 1310. Advantageously, the plurality of glue resist strips 1310 prevent the label 1300 from curling during application while still providing sufficient surface area for adhesive to bond the label 1300 to a bottle neck. Alternatively, a portion of the rear of the label 1300 can be coated with adhesive.

Figure 14:
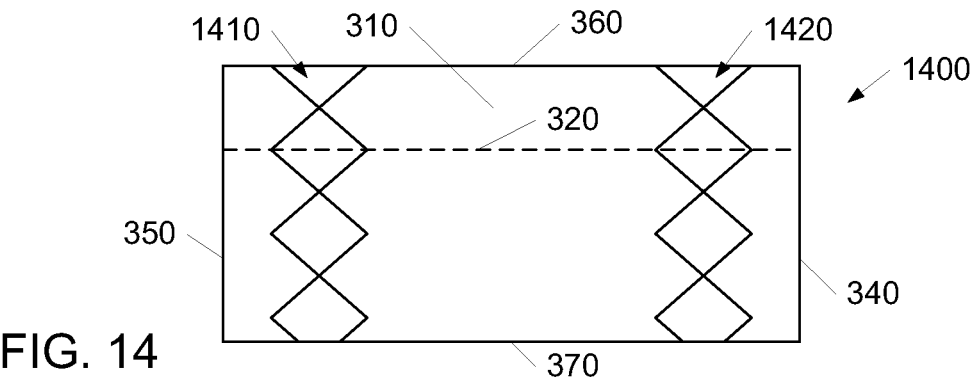
FIG. 14 is a back view of a label with a fourth glue resist pattern in accordance with an illustrative embodiment.

Referring to FIG. 14, a back view of a label with a fourth glue resist pattern 1400 in accordance with an illustrative embodiment is shown. The label 1400 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1400 is about 3" by 7" in dimension. The label 1400 can be a neck label, a front label, a back label, or any other kind of label.

The substrate 310 can include graphics (not shown). The label 1400 can include a perforation 320. The perforation 320 can extend horizontally across the label 300. Alternatively, a perforation can run vertically across a label. The perforation 320 can be surrounded by a glue resist (not shown) such as lacquer.

The label 1400 includes a first column of glue resist crosses 1410 and second column of glue resist crosses 1420. The first column of glue resist crosses 1410 and the second column of glue resist crosses 1420 are each about 0.375" wide and extend from the top edge 360 to the bottom edge 370. The first column of glue resist crosses 1410 and the second column of glue resist crosses 1420 include a series of 'X' shapes; however, any shape or pattern can be used. A first of the first column of glue resist crosses 1410 is offset from the trailing edge 350 by about 0.375" so that a 0.375" strip of substrate 310 is exposed. A first of the second column of glue resist crosses 1420 is offset from the leading edge 340 by about 0.375" so that a 0.375" strip of substrate 310 is exposed. The first column of glue resist crosses 1410 and the second column of glue resist crosses 1420 are made of a glue resist, as described above.

When the label 1400 is prepared for affixation to, for example, a bottle, the entire back surface is coated with adhesive, for example, by a labeling station. In one illustrative embodiment, the first column of glue resist crosses 1410 and the second column of glue resist crosses 1420 prevent the solvent of the adhesive from contacting or soaking into the area of the label 1400 beneath the first column of glue resist crosses 1410 and the second column of glue resist crosses 1420. The solvent of the adhesive can be water, an organic solvent, or any other solvent. In another illustrative embodiment, the adhesive only sticks to portions of the label 1400 that are not covered by the first column of glue resist crosses 1410 and the second column of glue resist crosses 1420. Advantageously, the first column of glue resist crosses 1410 and the second column of glue resist crosses 1420 prevent the label 1400 from curling during application while still providing sufficient surface area for adhesive to bond the label 1400 to a bottle neck. Alternatively, a portion of the rear of the label 1400 can be coated with adhesive.

Figure 15:
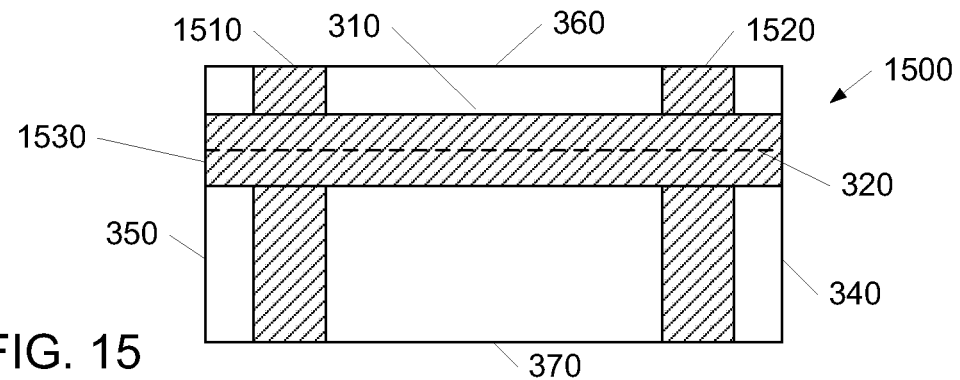
FIG. 15 is a back view of a label with a fifth glue resist pattern in accordance with an illustrative embodiment.

Referring to FIG. 15, a back view of a label with a fifth glue resist pattern 1500 in accordance with an illustrative embodiment is shown. The label 1500 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1500 is about 3" by 7" in dimension. The label 1500 can be a neck label, a front label, a back label, or any other kind of label.

The substrate 310 can include graphics (not shown). The label 1500 can include a perforation 320. The perforation 320 can extend horizontally across the label 300. Alternatively, a perforation can run vertically across a label. The perforation 320 can be surrounded by a perforation glue resist strip 1530.

The label 1500 includes a first glue resist strip 1510 and a second glue resist strip 1520. The first glue resist strip 1510 and the second glue resist strip 1520 are about 0.5" wide and extend from the top edge 360 to the bottom edge 370. An edge of the first glue resist strip 1510 is offset from the trailing edge 350 by about 0.75" so that a 0.75" strip of substrate 310 is exposed. An edge of the second glue resist strip 1520 is offset from the leading edge 340 by about 0.75" so that a 0.75" strip of substrate 310 is exposed. Alternatively, the glue resist strips can be of any width and offset. Alternatively, a glue resist strip can be only on one side of the label. Alternatively, the glue resist strip can be placed directly against the label edge. The first glue resist strip 1510 and the second glue resist strip 1520 are made of a glue resist as described above.

Thus, the glue resist forms an 'H' pattern. Optionally, the areas of the perforation glue resist strip 1530, first glue resist strip 1510 and the second glue resist strip 1520 can be embossed to enhance solvent degassing. Optionally, the label 1500 can be moisturized before application. For example, a stack of labels can be placed in a steaming chamber before use in order to increase the moisture content of the substrate 310 thereby reducing that ability of a water-based adhesive to swell the substrate.

When the label 1500 is prepared for affixation to, for example, a bottle, the entire back surface is coated with adhesive, for example, by a labeling station. In one illustrative embodiment, the perforation glue resist strip 1530, the first glue resist strip 1510 and the second glue resist strip 1520 prevent the solvent of the adhesive from contacting or soaking into the area of the label 1500 beneath the perforation glue resist strip 1530, the first glue resist strip 1510 and the second glue resist strip 1520. The solvent of the adhesive can be water, an organic solvent, or any other solvent. In another illustrative embodiment, the adhesive only sticks to portions of the label 1500 that are not covered by the perforation glue resist strip 1530, the first glue resist strip 1510 and the second glue resist strip 1520. Advantageously, the first glue resist strip 1510 and the second glue resist strip 1520 prevent the label 1500 from curling during application while still providing sufficient surface area for adhesive to bond the label 1500 to a bottle neck. Alternatively, a portion of the rear of the label 1500 can be coated with adhesive.

Figure 16:
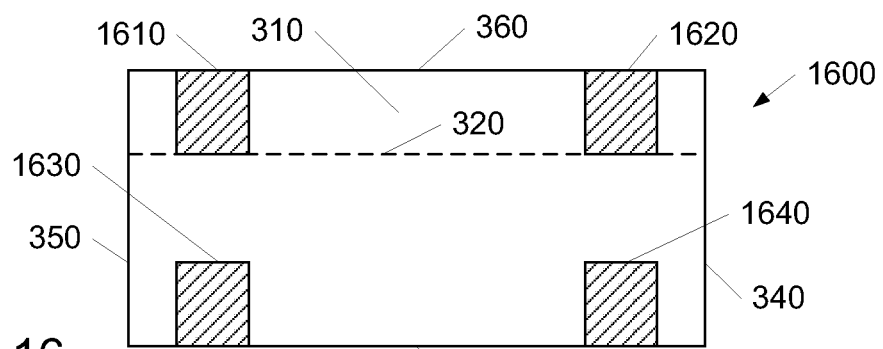
FIG. 16 is a back view of a label with a sixth glue resist pattern in accordance with an illustrative embodiment.

Referring to FIG. 16, a back view of a label with a sixth glue resist pattern 1600 in accordance with an illustrative embodiment is shown. The label 1600 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1600 is about 3" by 7" in dimension. The label 1600 can be a neck label, a front label, a back label, or any other kind of label.

The substrate 310 can include graphics (not shown). The label 1600 can include a perforation 320. The perforation 320 can extend horizontally across the label 300. Alternatively, a perforation can run vertically across a label. The perforation 320 can be surrounded by a glue resist (not shown) such as lacquer.

The label 1600 includes a first glue resist area 1610, a second glue resist area 1620, a third glue resist area 1630, and a fourth glue resist area 1640. The first glue resist area 1610, the second glue resist area 1620, the third glue resist area 1630, and the fourth glue resist area 1640 are each about 0.5" wide by 0.5" tall and border either the top edge 360 or the bottom edge 370. The first glue resist area 1610 and the third glue resist area 1630 are offset from the trailing edge 350 by about 0.375" so that a 0.375" strip of substrate 310 is exposed. The second glue resist area 1620 and the fourth glue resist area 1640 are offset from the leading edge 340 by about 0.375" so that a 0.375" strip of substrate 310 is exposed. The first glue resist area 1610, the second glue resist area 1620, the third glue resist area 1630, and the fourth glue resist area 1640 are made of a glue resist, as described above.

When the label 1600 is prepared for affixation to, for example, a bottle, the entire back surface is coated with adhesive, for example, by a labeling station. In one illustrative embodiment, the first glue resist area 1610, the second glue resist area 1620, the third glue resist area 1630, and the fourth glue resist area 1640 prevent the solvent of the adhesive from contacting or soaking into the area of the label 1600 beneath the first glue resist area 1610, the second glue resist area 1620, the third glue resist area 1630, and the fourth glue resist area 1640. The solvent of the adhesive can be water, an organic solvent, or any other solvent. In another illustrative embodiment, the adhesive only sticks to portions of the label 1600 that are not covered by the first glue resist area 1610, the second glue resist area 1620, the third glue resist area 1630, and the fourth glue resist area 1640. Advantageously, the first glue resist area 1610, the second glue resist area 1620, the third glue resist area 1630, and the fourth glue resist area 1640 prevent the label 1600 from curling during application while still providing sufficient surface area for adhesive to bond the label 1600 to a bottle neck. Alternatively, a portion of the rear of the label 1600 can be coated with adhesive.

Figure 17:
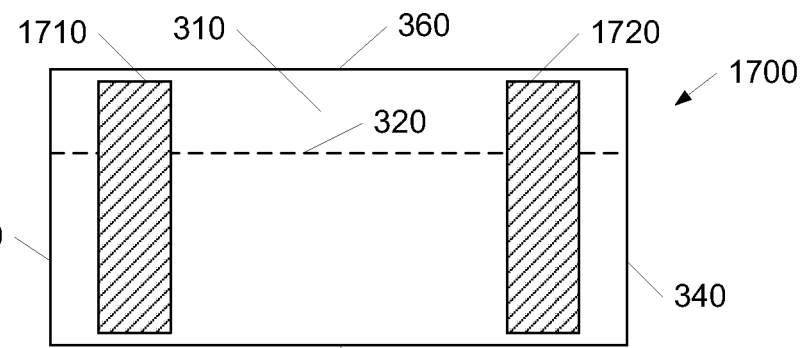
FIG. 17 is a back view of a label with a seventh glue resist pattern in accordance with an illustrative embodiment.

Referring to FIG. 17, a back view of a label with a seventh glue resist pattern 1700 in accordance with an illustrative embodiment is shown. The label 1700 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1700 is about 3" by 7" in dimension. The label 1700 can be a neck label, a front label, a back label, or any other kind of label.

The substrate 310 can include graphics (not shown). The label 1700 can include a perforation 320. The perforation 320 can extend horizontally across the label 300. Alternatively, a perforation can run vertically across a label.

The label 1700 includes a first glue resist strip 1710 and a second glue resist strip 1720. The first glue resist strip 1710 and the second glue resist strip 1720 are about 0.5" wide and are offset from the top edge 360 and the bottom edge 370 by about 0.2". An edge of the first glue resist strip 1710 is offset from the trailing edge 350 by about 0.75" so that a 0.75" strip of substrate 310 is exposed. An edge of the second glue resist strip 1720 is offset from the leading edge 340 by about 0.75" so that a 0.75" strip of substrate 310 is exposed. Alternatively, the glue resist strips can be of any width and offset. Alternatively, a glue resist strip can be only on one side of the label. Alternatively, the glue resist strip can be placed directly against the label edge. The first glue resist strip 1710 and the second glue resist strip 1720 are made of a glue resist as described above.

When the label 1700 is prepared for affixation to, for example, a bottle, the entire back surface is coated with adhesive, for example, by a labeling station. In one illustrative embodiment, the first glue resist strip 1710 and the second glue resist strip 1720 prevent the solvent of the adhesive from contacting or soaking into the area of the label 1700 beneath the first glue resist strip 1710 and the second glue resist strip 1720. The solvent of the adhesive can be water, an organic solvent, or any other solvent. In another illustrative embodiment, the adhesive only sticks to portions of the label 1700 that are not covered by the first glue resist strip 1710 and the second glue resist strip 1720. Advantageously, the first glue resist strip 1710 and the second glue resist strip 1720 prevent the label 1700 from curling during application while still providing sufficient surface area for adhesive to bond the label 1700 to a bottle neck. Advantageously, the adhesive that is placed above and below the resist strips can enhance adhesion to the neck and cap of a bottle. Alternatively, a portion of the rear of the label 1700 can be coated with adhesive.

Figure 18:
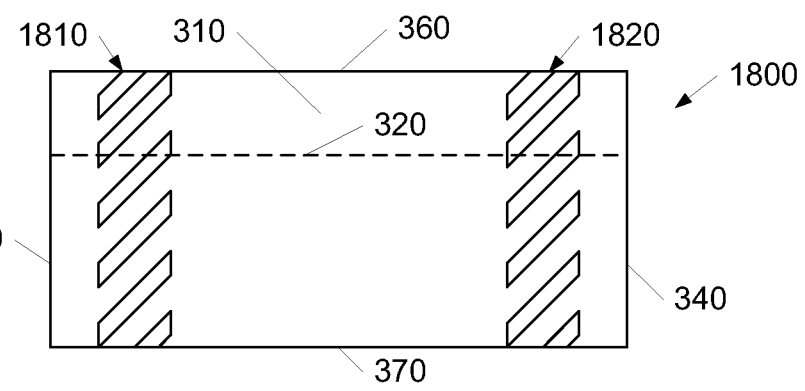
FIG. 18 is a back view of a label with an eighth glue resist pattern in accordance with an illustrative embodiment.

Referring to FIG. 18, a back view of a label with an eighth glue resist pattern 1800 in accordance with an illustrative embodiment is shown. The label 1800 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 1800 is about 3" by 7" in dimension. The label 1800 can be a neck label, a front label, a back label, or any other kind of label.

The substrate 310 can include graphics (not shown). The label 1800 can include a perforation 320. The perforation 320 can extend horizontally across the label 300. Alternatively, a perforation can run vertically across a label. The perforation 320 can be surrounded by a glue resist (not shown) such as lacquer.

The label 1800 includes a first column of glue resist tire tracks 1810 and second column of glue resist tire tracks 1820. The first column of glue resist tire tracks 1810 and the second column of glue resist tire tracks 1820 are each about 0.375" wide and extend from the top edge 360 to the bottom edge 370. The first column of glue resist tire tracks 1810 and the second column of glue resist tire tracks 1820 include a series of slash shapes; however, any shape such as 'V's or squiggles can be used. A first of the first column of glue resist tire tracks 1810 is offset from the trailing edge 350 by about 0.375" so that a 0.375" strip of substrate 310 is exposed. A first of the second column of glue resist tire tracks 1820 is offset from the leading edge 340 by about 0.375" so that a 0.375" strip of substrate 310 is exposed. The first column of glue resist tire tracks 1810 and the second column of glue resist tire tracks 1820 are made of a glue resist, as described above.

When the label 1800 is prepared for affixation to, for example, a bottle, the entire back surface is coated with adhesive, for example, by a labeling station. In one illustrative embodiment, the first column of glue resist tire tracks 1810 and the second column of glue resist tire tracks 1820 prevent the solvent of the adhesive from contacting or soaking into the area of the label 1800 beneath the first column of glue resist tire tracks 1810 and the second column of glue resist tire tracks 1820. The solvent of the adhesive can be water, an organic solvent, or any other solvent. In another illustrative embodiment, the adhesive only sticks to portions of the label 1800 that are not covered by the first column of glue resist tire tracks 1810 and the second glue resist strip 1120. Advantageously, the first column of glue resist tire tracks 1810 and the second column of glue resist tire tracks 1820 prevent the label 1800 from curling during application while still providing sufficient surface area for adhesive to bond the label 1800 to a bottle neck. Alternatively, a portion of the rear of the label 1800 can be coated with adhesive.

Figure 19:
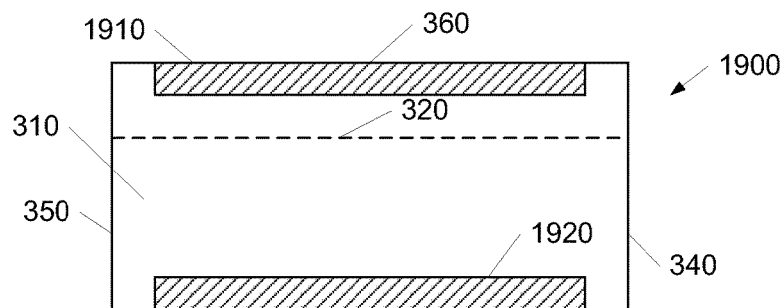
FIG. 19 is a back view of a label with a ninth glue resist pattern in accordance with an illustrative embodiment.

Referring to FIG. 19, a back view of a label with a ninth glue resist pattern 1900 in accordance with an illustrative embodiment is shown. The label 1900 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semipermeable or not permeable. The label 1900 is about 3" by 7" in dimension. The label 1900 can be a neck label, a front label, a back label, or any other kind of label.

The substrate 310 can include graphics (not shown). The label 1900 can include a perforation 320. The perforation 320 can extend horizontally across the label 300. Alternatively, a perforation can run vertically across a label. The perforation 320 can be surrounded by a glue resist (not shown) such as lacquer.

The label 1900 includes a first horizontal glue resist strip 1910 and second horizontal glue resist strip 1920. The first horizontal glue resist strip 1910 and the second horizontal glue resist strip 1920 are each about 0.2" wide and extend along the top edge 360 to the bottom edge 370. The first horizontal glue resist strip 1910 and the second horizontal glue resist strip 1920 are offset from the trailing edge 350 and the leading edge 340 by about 0.375" so that a 0.375" strip of substrate 310 is exposed. The first glue resist strips 1910 and the second glue resist strips 1920 are made of a glue resist, as described above.

When the label 1900 is prepared for affixation to, for example, a bottle, the entire back surface is coated with adhesive, for example, by a labeling station. In one illustrative embodiment, the first horizontal glue resist strip 1910 and the second horizontal glue resist strip 1920 prevent the solvent of the adhesive from contacting or soaking into the area of the label 1900 beneath the first horizontal glue resist strip 1910 and the second horizontal glue resist strip 1920. The solvent of the adhesive can be water, an organic solvent, or any other solvent. In another illustrative embodiment, the adhesive only sticks to portions of the label 1900 that are not covered by the first horizontal glue resist strip 1910 and the second horizontal glue resist strip 1920. Advantageously, the first horizontal glue resist strip 1910 and the second horizontal glue resist strip 1920 prevent the label 1900 from curling during application while still providing sufficient surface area for adhesive to bond the label 1900 to a bottle neck. Alternatively, a portion of the rear of the label 1900 can be coated with adhesive.

Figure 20:
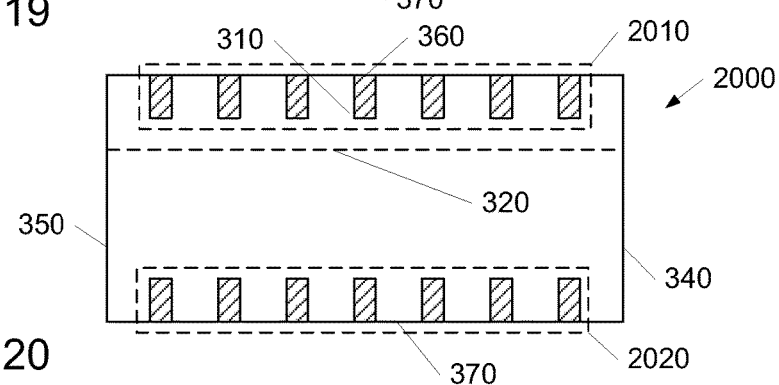
FIG. 20 is a back view of a label with a tenth glue resist pattern in accordance with an illustrative embodiment.

Referring to FIG. 20, a back view of a label with a tenth glue resist pattern 2000 in accordance with an illustrative embodiment is shown. The label 2000 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semipermeable or not permeable. The label 2000 is about 3" by 7" in dimension. The label 2000 can be a neck label, a front label, a back label, or any other kind of label.

The substrate 310 can include graphics (not shown). The label 2000 can include a perforation 320. The perforation 320 can extend horizontally across the label 300. Alternatively, a perforation can run vertically across a label. The perforation 320 can be surrounded by a glue resist (not shown) such as lacquer.

The label 2000 includes first glue resist areas 2010 and second glue resist areas 2020. The first glue resist areas 2010 and the second glue resist areas 2020 are each about 0.2" wide by 0.375" tall and are spaced along the top edge 360 and the bottom edge 370. The first glue resist areas 2010 and the second glue resist areas 2020 are made of a glue resist, as described above.

When the label 2000 is prepared for affixation to, for example, a bottle, the entire back surface is coated with adhesive, for example, by a labeling station. In one illustrative embodiment, the first glue resist areas 2010 and the second glue resist areas 2020 prevent the solvent of the adhesive from contacting or soaking into the area of the label 2000 beneath the first glue resist areas 2010 and the second glue resist areas 2020. The solvent of the adhesive can be water, an organic solvent, or any other solvent. In another illustrative embodiment, the adhesive only sticks to portions of the label 2000 that are not covered by the first glue resist areas 2010 and the second glue resist areas 2020. Advantageously, the first glue resist areas 2010 and the second glue resist areas 2020 prevent the label 2000 from curling during application while still providing sufficient surface area for adhesive to bond the label 2000 to a bottle neck. Alternatively, a portion of the rear of the label 2000 can be coated with adhesive.

Figure 21:
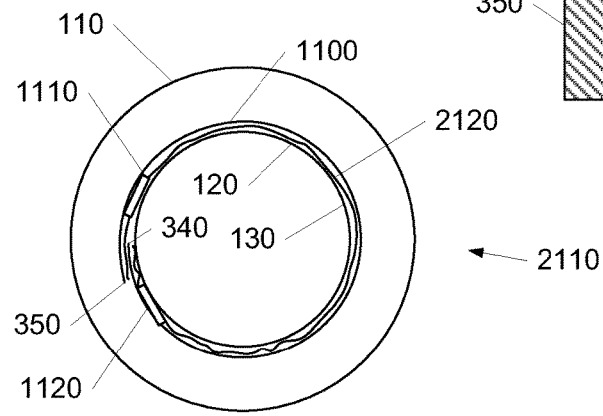
FIG. 21 is a top view of the label with a first glue resist pattern of FIG. 11 attached to a bottle in accordance with an illustrative embodiment.

Referring to FIG. 21, a top view of the label with a first glue resist pattern 1100 of FIG. 11 attached to a bottle 2110 in accordance with an illustrative embodiment is shown. The label 1100 is affixed to a neck 120 and a cap 130 of bottle 2110 by adhesive 2120. The label 1100 can be a neck label. Alternatively, the label 1100 can be a front label, a back label, or any other kind of label. The bottle 2110 can be made of polyethylene terephthalate (PET), glass, aluminum, high density polyethylene (HDPE), low density polyethylene (LDPE), polyvinyl chloride (PVC), polypropylene, polystyrene, any other plastic, or any other material. The label 1100 includes a first glue resist strip 1110 and a second glue resist strip 1120. In one illustrative embodiment, the first glue resist strip 1110 and the second glue resist strip 1120 prevent the solvent of the adhesive from contacting or soaking into the area of the label 1100 the first glue resist strip 1110 and the second glue resist strip 1120. In another illustrative embodiment, the adhesive only sticks to portions of the label 1100 that are not covered by the first glue resist strip 1110 and the second glue resist strip 1120. Advantageously, the first glue resist strip 1110 and the second glue resist strip 1120 prevent the label 1100 from curling during application while still providing sufficient surface area for adhesive to bond the label 1100 to a bottle neck.

Figure 22:
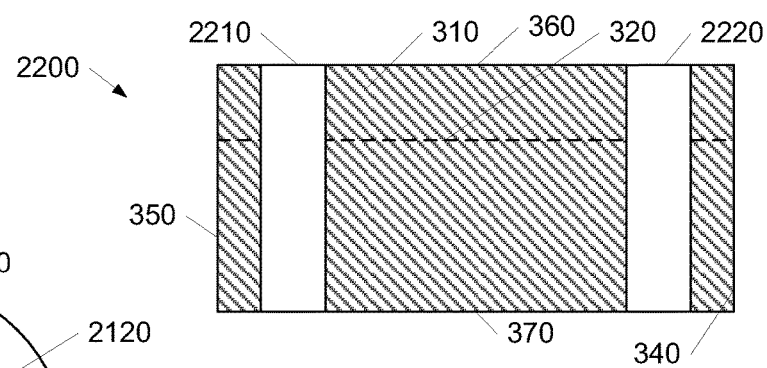
FIG. 22 is a back view of a label with a first adhesive pattern in accordance with an illustrative embodiment.

Alternatively, the adhesive can be applied in a specific pattern, for example, the pattern can be a negative image of one of FIGS. 11-20. Referring to FIG. 22, a back view of a label with a first adhesive pattern 2200 in accordance with an illustrative embodiment is shown. The label 2200 includes a substrate 310. The substrate 310 can be defined by a leading edge 340, a trailing edge 350, a top edge 360, and a bottom edge 370. As discussed above, the substrate 310 can be paper, coated paper, paper-foil combination, metalized paper, laminated paper, a polymer film, plastic, heat-shrink plastic, or any other substrate. The substrate 310 can be permeable, semi-permeable or not permeable. The label 2200 is about 3" by 7" in dimension. The label 2200 can be a neck label, a front label, a back label, or any other kind of label.

The substrate 310 can include graphics (not shown). The label 2200 can include a perforation 320. The perforation 320 can extend horizontally across the label 300. Alternatively, a perforation can run vertically across a label. The perforation 320 can be surrounded by a glue resist (not shown) such as lacquer.

The label 2200 includes a first area without adhesive 2210 and a second area without adhesive 2220. The first area without adhesive 2210 and the second area without adhesive 2220 are about 0.5" wide and extend from the top edge 360 to the bottom edge 370. An edge of the first area without adhesive 2210 is offset from the trailing edge 350 by about 0.75" so that a 0.75" strip of substrate 310 is exposed. An edge of the second area without adhesive 2220 is offset from the leading edge 340 by about 0.75" so that a 0.75" strip of substrate 310 is exposed. The adhesive can be, for example, Henkel Optal 10-7302M available from Henkel Corporation, Dusseldorf, Germany. Alternatively, the areas without adhesive can be of any width and offset. Alternatively, an area without adhesive can be only on one side of the label. Alternatively, the area without adhesive can be located directly against the label edge.

When the label 2200 is prepared for affixation to, for example, a bottle, adhesive is applied to the back of the label 2200 respective to the pattern delineated by the areas without adhesive (e.g. 2210, 2220). Adhesive can be applied, for example, by a labeling station using an intaglio-type process such as rotogravure or flexography. Alternatively, glue needles, rollers or spray jets can be used. Advantageously, the first area without adhesive 2210 and the second area without adhesive 2220 prevent the label 2200 from curling during application while still providing sufficient surface area for adhesive to bond the label 2200 to a bottle neck.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An article of manufacture, comprising:
a label, wherein the label comprises a top edge, a bottom edge, a leading edge, and a trailing edge; and
a first glue resist area on a back of the label, wherein the first glue resist area includes a coating that resists application of an adhesive; and
a second glue resist area on the back of the label, wherein the second glue resist area includes the coating that resists application of the adhesive, wherein
the first glue resist area extends continuously from the top edge to the bottom edge and the first glue resist area is offset from the leading edge, the trailing edge, and the second glue resist area,
the second glue resist area extends continuously from the top edge to the bottom edge and the second glue resist area is offset from the leading edge, the trailing edge, and the first glue resist area, and
the coating of the first glue resist area and the coating of the second glue resist area are configured to prevent at least one edge of the label from curling during a labeling process, wherein the coating of the first glue resist area and the coating of the second glue resist area are located directly between the label and a container to which the label is attached during the labeling process.

2. The article of manufacture of claim 1, wherein
the first glue resist area and the second glue resist area are configured to prevent a solvent of an adhesive from reaching the label.

3. The article of manufacture of claim 1, wherein the first glue resist area is about 0.2 inches, 0.375 inches, or 0.5 inches wide and the second glue resist area is about 0.2 inches, 0.375 inches, or 0.5 inches wide.

4. The article of manufacture of claim 1, wherein the first glue resist area is offset from the leading edge by about 0.75 inches or 0.375 inches and the second glue resist area is offset from the trailing edge by about 0.75 inches or 0.375 inches.

5. The article of manufacture of claim 2, further comprising:
a third glue resist area on the back of the label disposed in between the first glue resist area and second glue resist area; and
a fourth glue resist area on the back of the label disposed in between the first glue resist area and second glue resist area; and
wherein the first glue resist area, the second glue resist area, the third glue resist area, and the fourth glue resist area are configured to prevent the top edge and the bottom edge of the label from curling during the labeling process.

6. The article of manufacture of claim 2, wherein the first glue resist area and the second glue resist area each comprise a pattern.

7. The article of manufacture of claim 1, wherein the label comprises at least one of a semi-permeable substrate or a permeable substrate.

8. The article of manufacture of claim 1, wherein the label comprises a metalized paper.

9. The article of manufacture of claim 1, wherein the first glue resist area comprises a glue resist including at least one of a lacquer, a wax, a polymer, a plastic film, or a hydrophobic coating.

10. The article of manufacture of claim 1, further comprising a third glue resist area on the back of the label, wherein:
the third glue resist area includes the coating that resists application of the adhesive;
the third glue resist area extends continuously from the leading edge to the trailing edge, is offset from the bottom edge and the top edge, and intersects with the first glue resist area and the second glue resist area;
the label comprises a perforation, and wherein the perforation
comprises a plurality of holes along which the label can be torn, and
is disposed within the third glue resist area.

11. An apparatus, comprising:
a container;
a label, wherein the label comprises a top edge, a bottom edge, a leading edge, and a trailing edge;
a first glue resist area on a back of the label; and
a second glue resist area on the back of the label; wherein
the label is attached to the container using an adhesive;
the first glue resist area and the second glue resist area include a coating that is configured to prevent a solvent of the adhesive from reaching the label;
the first glue resist area extends continuously from the top edge to the bottom edge and the first glue resist area is offset from the leading edge, the trailing edge, and the second glue resist area;
the second glue resist area extends continuously from the top edge to the bottom edge and the second glue resist area is offset from the trailing edge, the leading edge, and the first glue resist area; and
the coating of the first glue resist area and the coating of the second glue resist area are configured to prevent at least one edge of the label from curling during a labeling process, wherein the coating of the first glue resist area and the coating of the second glue resist area are located directly between the label and the container.

12. The apparatus of claim 11, wherein the first glue resist area is about 0.2 inches, 0.375 inches, or 0.5 inches wide and the second glue resist area is about 0.2 inches, 0.375 inches, or 0.5 inches wide.

13. The apparatus of claim 11, wherein the first glue resist area is offset from the leading edge by about 0.75 inches or 0.375 inches and the second glue resist area is offset from the trailing edge by about 0.75 inches or 0.375 inches.

14. The apparatus of claim 11, wherein the label comprises a metalized paper and the glue resist glue resist comprises at least one of a lacquer, a polymer, a wax, a plastic film, or a hydrophobic coating.

15. The article of manufacture of claim 1, further comprising a plurality glue resist areas on the back of the label, wherein:
the plurality of glue resist areas include the coating that resists application of the adhesive;
each of the plurality glue resist areas extend continuously from the top edge to the bottom edge;
each of the plurality glue resist areas are offset from the leading edge, the trailing edge, the first glue resist area, and the second glue resist area; and the plurality of glue resist areas are separate from each other.

16. The article of manufacture of claim 15, wherein the first glue resist area, the second glue resist area, and the plurality of glue resist are normal to a perforation that extends from the leading edge to the trailing edge.

17. The article of manufacture of claim 15, wherein the plurality of glue resist areas are configured to prevent the top edge and the bottom edge from curling.

* * * * *